July 25, 1933.   H. E. CHILDS   1,919,200
HEADLIGHT TESTING DEVICE
Filed Dec. 14, 1931
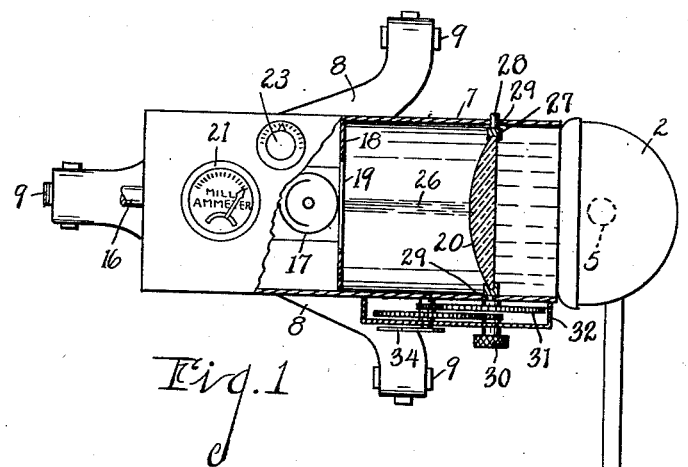
Fig. 1
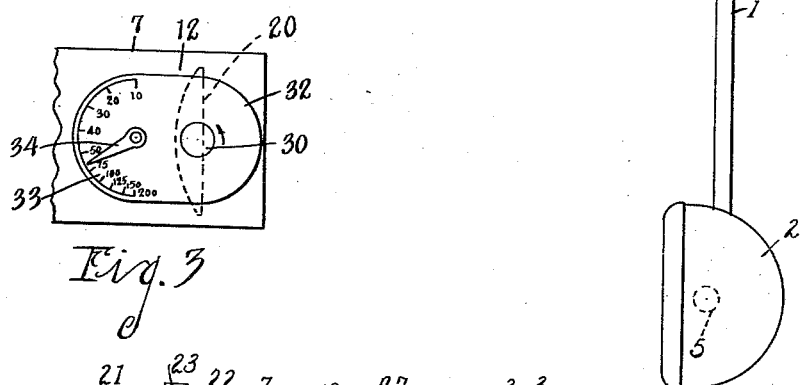
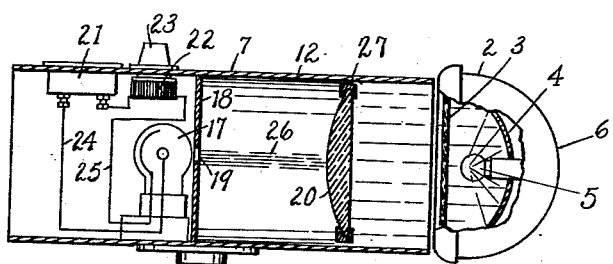
Fig. 3
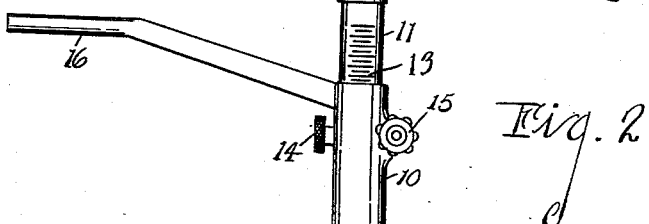
Fig. 2
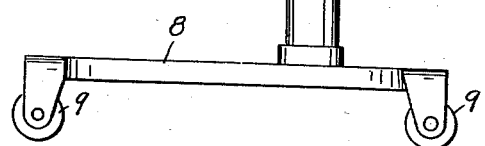
INVENTOR
Harry E. Childs
BY
Chappell Karl
ATTORNEYS Patented July 25, 1933

1,919,200

UNITED STATES PATENT OFFICE

HARRY E. CHILDS, OF KALAMAZOO, MICHIGAN, ASSIGNOR TO ATLAS PRESS COMPANY, OF KALAMAZOO, MICHIGAN

HEADLIGHT TESTING DEVICE

Application filed December 14, 1931. Serial No. 581,043.

The main object of this invention is to provide means for quickly and accurately determining the point at which the light from an automobile headlamp will strike the road in front of the vehicle.

Another object is to provide an apparatus for testing and adjusting the intensity and to determine if the bulb is at the focal point of a reflector.

A further object is to provide an apparatus of this character which is simple in construction, economical to manufacture, and efficient and accurate in operation.

Objects relating to details and economies of my invention will appear from the description to follow. The invention is defined and pointed out in the claims.

A structure which is a preferred embodiment of my invention is illustrated in the accompanying drawing, in which:

Fig. 1 is a top plan view of a headlight testing device embodying my invention associated with an automobile headlamp, a portion of the casing of the device being broken away and shown in horizontal section.

Fig. 2 is a side elevation, portions of the lamp and casing being broken away and shown in vertical section, and Fig. 3 is a fragmentary side elevation.

Referring to the drawing, numeral 1 indicates a cross bar supporting the automobile headlamps shown conventionally at 2. Each of the headlamps 2 is provided with the usual lens 3, reflector 4, light bulb 5, and outer casing 6.

The headlight testing device 7 consists of the carriage 8 provided with wheels 9 and with the vertical tubular standard 10 in which is telescoped for vertical adjustment the post 11 which supports the casing 12. The post 11 is provided with graduations 13 for indicating the relative vertical position of the casing 12 when the latter is elevated or lowered by adjusting the screw 14. The standard 10 is provided with means for clamping the post 11 in place, which means includes the hand wheel 15. The standard 10 is also provided with a rearwardly extending handle 16 for moving the device from place to place and for adjusting it in position relative to the headlamps to be tested.

Within the casing 12 is mounted a heat or light-sensitive element such as a photo-electric cell 17, a light screen 18 having a horizontal slit 19 therein, and a condensing lens 20, the light screen 18 being disposed between the cell 17 and the lens 20, as illustrated. A milliammeter 21, or other suitable indicating device, and an adjustable resistance 22 having an adjusting knob 23 are mounted on the casing 12 so as to be observed and manipulated from the outside of the casing and are connected in series circuit relation with the light-sensitive element 17 by the insulated conductors 24 and 25.

For testing the intensity and focusing of the headlight 2, the open-ended casing 12 is positioned in front of the headlight, as illustrated, and the light bulb 5 is adjusted until the beam of light 26 therefrom passes through the slit 19. The maximum reading of the milliammeter 21 is a measure of the intensity of the light emitted from the headlight 2.

To determine whether the bulb is at the focal point of the paraboloid, the casing is set parallel with the light rays and against the light. The light measuring device will now indicate a definite reading if the bulb is exactly in focus. If not in focus, a different reading will be obtained and the bulb should be adjusted until the correct value is obtained.

The lens 20 is carried by a frame 27 which is provided with opposed horizontal pivot pins 28 which extend in receiving holes 29 in the casing 12. The lens is tilted by manually turning the knob 30 which is connected to the lens through reducing gears 31 housed within the casing 32. The casing 32 carries a scale 33 suitably calibrated to indicate the distance from the vehicle at which the light beam strikes the road. The pointer 34 is connected to the gear train 31 and plays over the scale 33 for this purpose.

If desired, a heat sensitive element such as a thermocouple may be used in lieu of the light-sensitive cell.

For determining the candle-power of an electric bulb or the like, the latter is focussed on the photo-electric cell or light-sensitive element and the measuring instrument indicates the out-put of the cell, which is a measure or function of the light emitted from the light source. The rheostat is used for keeping the needle of the measuring instrument on its scale, particularly for bulbs of high candle-power.

It is obvious that various changes and modifications may be made in the details of construction and design of the above specifically described embodiment of my invention without departing from the spirit thereof, such changes and modifications being restricted only by the scope of the following claims.

Having thus described my invention, what I claim as new and desire to secure by Letters Patent is:

1. In a device of the class described, the combination of a casing having an open end for receiving the light beam of a headlamp, a light condensing lens mounted in said casing for rotation about a horizontal axis normal to the direction of the light beam, a calibrated scale and a pointer associated with said casing and said lens for indicating the point at which the light beam will strike the road in front of the headlamp, a light screen having a horizontal slit disposed in front of said lens, and a light-sensitive cell disposed in front of said screen and providing with said slit a reference line for said beam of light.

2. A device for determining the direction, focus and intensity of a beam of light from an automobile headlamp, comprising in combination a light condensing lens mounted for rotation about a horizontal axis normal to the direction of the light beam, light sensitive means arranged to receive the concentrated light beam from said lens, indicating means associated with said light sensitive means, and a light screen disposed between said lens and light sensitive means and having a horizontal restricted aperture for the passage of light.

3. A device for determining the direction, focus and intensity of a beam of light from a headlamp, comprising in combination a light condensing lens mounted for rotation about an axis normal to the direction of the light beam, light sensitive means arranged to receive the concentrated light beam from said lens, indicating means associated with said light sensitive means, and a light screen disposed between said lens and light sensitive means and having a restricted aperture for the passage of light.

HARRY E. CHILDS.